United States Patent
Badding et al.

(10) Patent No.: US 6,428,920 B1
(45) Date of Patent: Aug. 6, 2002

(54) ROUGHENED ELECTROLYTE INTERFACE LAYER FOR SOLID OXIDE FUEL CELLS

(75) Inventors: Michael E. Badding, Elmira; Thomas D. Ketcham, Big Flats; Dell J. St. Julien, Watkins Glen; Raja R. Wusirika, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/573,326

(22) Filed: May 18, 2000

(51) Int. Cl.[7] .............................................. H01M 8/12
(52) U.S. Cl. ...................... 429/30; 429/33; 429/304; 428/699
(58) Field of Search ........................ 429/30, 33, 304, 429/320, 321, 322; 428/699

(56) References Cited

U.S. PATENT DOCUMENTS

| | | | |
|---|---|---|---|
| 5,089,455 A | 2/1992 | Ketcham et al. | 501/104 |
| 5,273,837 A | 12/1993 | Aitken et al. | 429/30 |
| 5,512,387 A | * 4/1996 | Ovshinsky | 429/152 |

OTHER PUBLICATIONS

Minh, "High–Temperature Fuel Cells Part 2: The Solid Oxide Cell," *Chemtech.*, 21:120–126 (1991). (Feb).

Minh et al., *Science and Technology of Ceramic Fuel Cells*, Elsevier, p. 255 (1995) (no month).

Murray et al. in "Improved Performance in $(La,Sr)MnO_3$ and $(La,Sr)(Co,Fe)O_3$ Cathodes By the Addition of a Gd–Doped Ceria Second Phase", *Electrochem. Soc. Proc.*, PV 99–19: 369–379 (1999) (no month).

* cited by examiner

Primary Examiner—Stephen Kalafut
(74) Attorney, Agent, or Firm—Kees van der Sterre

(57) ABSTRACT

The present invention relates to an electrolyte structure coated on at least one surface with a roughened interfacial nano-crystalline layer. Another aspect of the present invention is a solid oxide fuel cell which includes a positive air electrode, a negative fuel electrode, an electrolyte structure interposed between the positive air electrode and negative fuel electrode, and a roughened interfacial nano-crystalline layer interposed between the electrolyte structure and at least one of the positive air electrode and negative fuel electrode. The present invention also relates to methods of making the coated electrolyte and solid oxide fuel cell.

68 Claims, 2 Drawing Sheets

ROUGHENED ELECTROLYTE INTERFACE LAYER FOR SOLID OXIDE FUEL CELLS

BACKGROUND OF THE INVENTION

The present invention relates to an electrolyte coated with a roughened interfacial nano-crystalline layer and its use in solid oxide fuel cells.

The use of solid electrolyte materials for fuel cells and oxygen pumps has been the subject of a considerable amount of research for many years. The typical essential components of a solid oxide fuel cell ("SOFC") include a dense, oxygen-ion-conducting electrolyte sandwiched between porous, conducting metal, cermet, or ceramic electrodes. Electrical current is generated in such cells by the oxidation, at the anode, of a fuel material, such as hydrogen, which reacts with oxygen ions conducted through the electrolyte from the cathode.

Practical power generation units will typically include multiple fuel cells of such configuration interconnected in series or parallel with electronically conductive ceramic, cermet, or metal interconnect materials. At the present time, the materials of choice for such devices include yttria-($Y_2O_3$) stabilized zirconia ($ZrO_2$) for the electrolyte, nickel-$ZrO_2$ cermet for the anode material, strontium-doped lanthanum manganite ($LaMnO_3$) for the cathode, and metals, especially Cr/Fe alloys and Ni alloys, intermetallics, and Sr or Ba doped $LaCrO_3$, for interconnect structures. Alternative oxygen ion conductors are known. At sufficient temperatures (e.g., 600° C. or above), zirconia electrolytes can exhibit good ionic conductivity but low electronic conductivity.

Several different designs for solid oxide fuel cells have been developed, including, for example, a supported tubular design, a segmented cell-in-series design, a monolithic design, and a flat plate design. All of these designs are documented in the literature, with one recent description in Minh, "High-Temperature Fuel Cells Part 2: The Solid Oxide Cell," *Chemtech.*, 21:120–126 (1991).

The tubular design comprises a closed-end porous zirconia tube exteriorly coated with electrode and electrolyte layers. The performance of this design is somewhat limited by the need to diffuse the oxidant through the porous tube. Westinghouse has numerous U.S. patents describing fuel cell elements that have a porous zirconia or lanthanum strontium manganite cathode support tube with a zirconia electrolyte membrane and a lanthanum chromate interconnect traversing the thickness of the zirconia electrolyte. The anode is coated onto the electrolyte to form a working fuel cell tri-layer, containing an electrolyte membrane, on top of an integral porous cathode support or porous cathode, on a porous zirconia support. Segmented designs proposed since the early 1960s (Minh et al., *Science and Technology of Ceramic Fuel Cells*, Elsevier, p. 255 (1995)), consist of cells arranged in a thin banded structure on a support, or as self-supporting structures as in the bell-and-spigot design.

A number of planar designs have been described which make use of free-standing electrolyte membranes. A cell is formed by applying electrodes and consists of the electrolyte sheet and the applied electrodes. Typically these cells are then stacked and connected in series to build voltage. Monolithic designs, which characteristically have a multi-celled or "honeycomb" type of structure, offer the advantages of high cell density and high oxygen conductivity. The cells are defined by combinations of corrugated sheets and flat sheets incorporating the various electrode, conductive interconnect, and electrolyte layers, with typical cell spacings of 1–2 mm and electrolyte thicknesses of 25–100 microns.

U.S. Pat. No. 5,273,837 to Aitken et al. covers sintered electrolyte compositions in thin sheet form for thermal shock resistant fuel cells. It describes an improved method for making a compliant electrolyte structure wherein a precursor sheet, containing powdered ceramic and binder, is pre-sintered to provide a thin flexible sintered polycrystalline electrolyte sheet. Additional components of the fuel cell circuit are bonded onto that pre-sintered sheet including metal, ceramic or cermet current conductors bonded directly to the sheet as also described in U.S. Pat. No. 5,089,455 to Ketcham et al. U.S. Pat. No. 5,273,837 to Aitken et al. shows a design where the cathodes and anodes of adjacent sheets of electrolyte face each other and where the cells are not connected with a thick interconnect/separator in the hot zone of the fuel cell manifold. These thin flexible sintered electrolyte-containing devices are superior due to the low ohmic loss through the thin electrolyte as well as to their flexibility and robustness in the sintered state.

The performance of a fuel cell, i.e., the current carrying capacity and hence the overall efficiency of the cell, is limited by its internal resistance, the maximum power for any power supply being given by $P_{max}=V^2/4R_{internal}$. The fuel cell circuit consists of the electrolyte, electrodes, and current conductors. Internal resistance is the sum of several components including the electrode ohmic resistance, the electrolyte resistance, the electrode/electrolyte interfacial resistance to charge transfer reaction, and the current conductor resistance. The interfacial resistance to charge transfer depends mainly on the electrochemical behavior, and physical and chemical nature of the electrode.

Prior art devices have been unable to satisfactorily reduce this interfacial resistance in SOFCs. For example, dense thin layers of $CeO_2$ have been sputtered on zirconia to avoid forming lanthanum zirconate type compounds by reacting with $La(Sr)MnO_3$ during cathode sintering. Lanthanum zirconate compounds have poor ionic conductivity and heavily degrade the performance of the fuel cell when present at the electrode-electrolyte interface. Murray et al. in "Improved Performance in $(La,Sr)MnO_3$ and $(La,Sr)(Co,Fe)O_3$ Cathodes By the Addition of a Gd-Doped Ceria Second Phase", *Electrochem. Soc. Proc.*, PV 99–19: 369–379 (1999) describe the application of ceria-modified cathodes having reduced interfacial resistance to electrolyte surfaces that were grit-roughened to improve electrode film adhesion.

The present invention is directed to providing an improved fuel cell construction, applicable to any of the above fuel cell designs, which provides a cell of improved physical, thermal, and electrical properties. In particular, the present invention is directed to overcoming the performance limitations of high electrode/electrolyte interfacial resistance and poor adhesion between electrodes and electrolytes.

SUMMARY OF THE INVENTION

The present invention relates to an electrolyte structure coated on at least one surface with a roughened interfacial nano-crystalline layer.

The present invention also relates to a method of making an electrolyte structure with a roughened interfacial nano-crystalline layer. This method involves providing an electrolyte substrate, applying an interfacial layer of particulates onto at least one surface of the electrolyte substrate, and sintering the interfacial layer.

Another aspect of the present invention is a solid oxide fuel cell which includes a positive air electrode, a negative fuel electrode, an electrolyte structure interposed between the positive air electrode and negative fuel electrode, and a roughened interfacial nano-crystalline layer interposed between the electrolyte structure and at least one of the positive air electrode and negative fuel electrode.

Yet another aspect of the present invention is a solid oxide fuel cell which includes a positive air electrode, a negative fuel electrode, an electrolyte structure interposed between the positive air electrode and negative fuel electrode, wherein the electrolyte structure is bonded to a plurality of electrodes on opposing sides of the electrolyte structure under conditions effective to produce at least two multiple cells connected in series or parallel and wherein the at least two multiple cell fuel cells are combined in an alternating fuel/air manifold wherein similar electrodes of adjacent multiple cell fuel cells face each other under conditions effective to form regions of air or fuel without additional gas separation or interconnection layers, and a roughened interfacial nano-crystalline layer interposed between the electrolyte structure and at least one of the positive air electrode and negative fuel electrode.

The present invention also relates to a method of making a solid oxide fuel cell. This method involves providing an electrolyte substrate, applying a least one interfacial nano-crystalline layer onto at least one surface of the electrolyte substrate, sintering the at least one interfacial nano-crystalline layer, and applying at least one electrode layer to the at least one interfacial nano-crystalline layer.

The roughened interfacial nano-crystalline layer of the present invention reduces interfacial resistance in solid electrolyte fuel cells. Reduced interface resistance leads to higher power densities and/or lower temperature operation of the fuel cell. Thus, the performance of a fuel cell, i.e., the current carrying capacity and hence the overall efficiency of the cell, is improved. In addition, adhesion of electrodes to an electrolyte is improved by use of the roughened interfacial nano-crystalline layer of the present invention.

DETAILED DESCRIPTION

Figure 1:
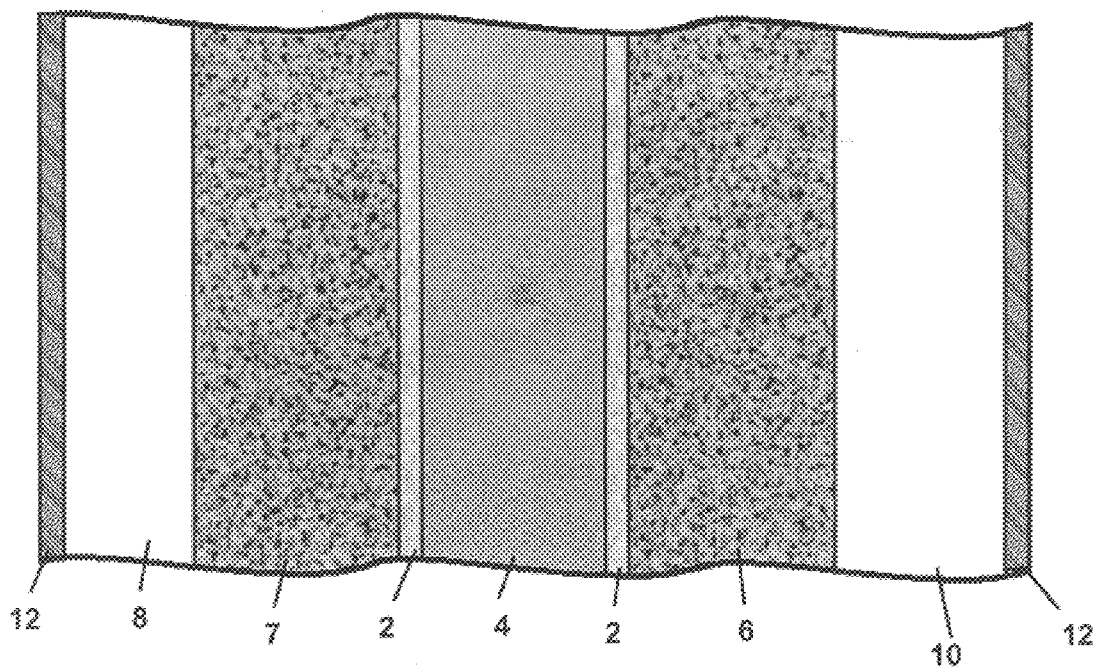
FIG. 1 is a schematic of interface layers in a solid oxide fuel cell.

The present invention relates to an electrolyte structure coated on at least one surface with a roughened interfacial nano-crystalline layer. As used herein, a nano-crystalline layer comprises a crystalline layer made up of crystallites having a grain size below 1 $\mu$m, preferably below 0.5 $\mu$m. In one embodiment, the electrolyte structure is a polycrystalline ceramic. Preferred polycrystalline ceramics include stabilized zirconia, partially stabilized zirconia, stabilized hafnia, partially stabilized hafnia, mixtures of zirconia and hafnia, ceria with zirconia, bismuth with zirconia, gadolinium, and germanium. Most preferred are stabilized and partially stabilized zirconia. These include partially stabilized zirconia or stabilized zirconia, either being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

In a preferred embodiment, the electrolyte structure of the present invention is below 45 microns in thickness, preferably below 30 microns in thickness, and most preferably 5–20 microns in thickness. The thin flexible polycrystalline ceramic electrolyte of the present invention offers enhanced thermal shock resistance and electrochemical performance, and provides a durable free-standing electrolyte layer to which the interfacial layer may easily be applied. U.S. Pat. No. 5,089,455 to Ketcham et al., which is hereby incorporated by reference, describes the formulation and manufacture of free-standing thin electrolytes of this type, and that patent may be referred to for additional detailed description of such materials.

The surfaces of flexible sintered ceramic sheet electrolytes, such as those of tape-cast partially stabilized (3% yttria-doped) zirconia provided in accordance with the above patent, are relatively smooth. Representative arithmetic average (Ra) roughness values on the order of 60 nm have been measured on such sheets by Zygo optical profilometer, notwithstanding the inclusion in the measurements of scattered peaks and valleys above 330 nm in maximum dimension on the surfaces of the electrolyte sheet being measured.

In contrast, the roughened interface layers provided in accordance with the invention generally exhibit arithmetic average surface roughnesses greater than 150 nm, more typically greater than 200 nm, when measured by the same technique. This increase appears largely due to the presence of much greater numbers of much larger peaks and valleys in the surface material. When the interface layers are applied by the preferred slip coating methods hereinafter more fully described, this surface texture could perhaps arise the nanoparticles in the large, weakly flocculated structures in the interface coating slip. On a larger scale, boundaries between the flocculated structures appear to give deep valleys down to the electrolyte surface.

In any case, we have found that the increase in roughness caused by the interface layer improves both mechanical and electrochemical (low interface resistance) performance for the electrodes and the fuel cell. The roughness, on both the fine scale of many more peaks and on the larger scale of the deep valleys of the thin boundary structure, improves adhesion of electrodes that are not completely matched in thermal expansion coefficient. The data suggests that the increase in the fine scale peaks also improves electrochemical performance by having more electrode—electrolyte contact area for the electrochemical reactions to occur.

In a preferred embodiment of the invention, the interfacial layer is a polycrystalline ceramic of the same composition as the electrolyte structures described above. Particularly suitable for interfacial layers with zirconia electrolytes are partially stabilized zirconia and stabilized zirconia as described above, $CeO_2$ doped with $Y_2O_3$ or Pr, and mixtures thereof. An interfacial layer of $CeO_2$ doped with $Y_2O_3$ or Pr, or $ZrO_2$ doped with Tb could have both ionic and electronic conduction. In conjunction with the rough/porous geometry of the interfacial layer, this could lower the interfacial resistance further and allow operation at even lower temperatures.

The interfacial layers of the present invention do have an ohmic component to their resistance. The thinner and denser the interface layers are, the lower this ohmic component is. Therefore, in a preferred embodiment, the interfacial layer is less than five microns in thickness, more preferably, less than two microns in thickness, and most preferably, less than one micron in thickness.

Three phase boundaries may be enhanced through infiltration of the interfacial layer with an electronic conductive phase. Thus, in one embodiment of the present invention, the interfacial layer further includes an electronic conductive phase which can be used for electrical current paths. Typically this phase will be distributed homogeneously throughout the granular structure of the interfacial layer.

Preferably, the electronic conductive phase is a metal, metal alloy, or cermet. Suitable metals include platinum, palladium, gold, silver, and mixtures thereof. Suitable alloys include alloys with platinum, palladium, gold, silver, mixtures thereof, and other metals. Suitable cermets include zirconia, chromia, alumina, or titania combined with platinum, palladium, gold, or silver, and cermets with perovskites. Also, mixtures of these metals with glass and glass ceramics are suitable. Especially preferred is silver metal. The addition of silver metal to an interfacial layer leads to a beneficial reduction in interface resistance. Such addition of an electronic conductive phase may be accomplished by methods known to those of ordinary skill in the art. For example, addition of silver metal may be accomplished by infiltrating a silver nitrate solution, followed by a heat treatment to convert the nitrate to metal.

The present invention also relates to a method of making an electrolyte structure with a roughened interfacial nano-crystalline layer. This method involves providing an electrolyte substrate, applying at least one interfacial nano-crystalline layer onto at least one surface of the electrolyte substrate, and sintering the at least one interfacial nano-crystalline layer.

In one embodiment, the applying comprises coating the electrolyte substrate with oxide grains. In another embodiment, the applying comprises coating the electrolyte substrate with precursor compounds that decompose to grains. Suitable precursor compounds include zirconium acetate, -oxynitrate, -chloride, -sulfate, and hydroxide, as well as preparations of colloidal zirconia.

A suitable method for applying the interfacial layer of the present invention onto an electrolyte substrate includes a tape casting approach with a particulate slip as hereinafter more fully described. Other suitable methods for applying the interfacial layer of the present invention include dip coating, curtain coating, spray coating, electrostatic coating, and brush coating. In addition, a variety of printing and decal methods could be used to cover all or parts of a dense electrolyte substrate to form a precursor to the interfacial layer.

One preferred embodiment of the method of the present invention includes providing a slip similar to that used to make the electrolyte and coating it on a sintered electrolyte substrate, followed by sintering of the coating. Another preferred embodiment of the method of the present invention includes providing a slip similar to that used to make the electrolyte and coating it on a un-sintered electrolyte substrate, followed by co-sintering the electrolyte and coating. These methods leave some fine scale surface roughness on the electrolyte. Depending upon the sintering time and temperature the coating can be porous.

The sintering temperature and coating thickness (slip dilution ratio) are adjusted in the method of the present invention to obtain the best compromise between reducing the ohmic component and keeping the interface resistance component as low as possible for the operating temperature.

Figure 2:
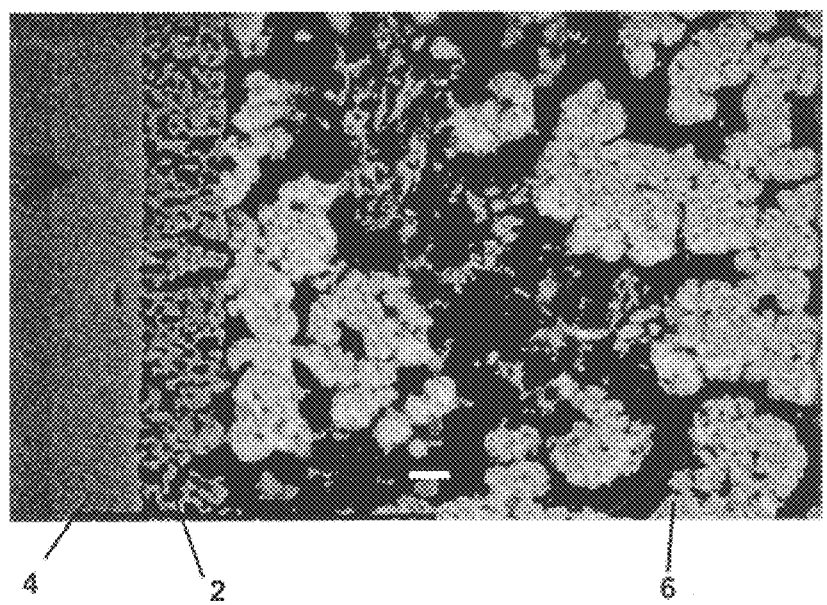
FIG. 2 is an SEM micrograph showing electrolyte, electrode, and interface layers in a solid oxide fuel cell.

Another aspect of the present invention is a solid oxide fuel cell which includes a positive air electrode, a negative fuel electrode, an electrolyte structure interposed between the positive air electrode and negative fuel electrode, and a roughened interfacial nano-crystalline layer interposed between the electrolyte structure and at least one of the positive air electrode and negative fuel electrode. FIG. 1 shows a schematic cross-sectional illustration of a segment of a fuel cell unit provided in accordance with the invention. In the partial elevational view of FIG. 1, roughened interfacial nano-crystalline layers 2 are interposed between the electrolyte 4 and each of electrodes 6 and 7. FIG. 2 shows an SEM photomicrograph of a cross-section showing the interfacial layer 2, the electrolyte 4, and the electrode 6.

As with all conventional solid electrolyte fuel cells, the solid electrolyte fuel cells of the present invention, as shown in FIG. 1, conventionally include at least an oxidant channel 8 and a fuel channel 10, which may be bounded by other electrodes or by gas-containing wall elements such as walls 12. These reservoirs are separated from each other by the electrode-electrolyte structure, the electrolyte being active to permit ionic conduction but restrict electronic conduction between the oxidant and fuel reservoirs.

In an important aspect of the present invention, the fuel cell includes an electrolyte structure with at least one interfacial layer bonded directly or indirectly to at least one other fuel cell component selected from the group consisting of dense or porous electrode layers, current conductors, and electric leads.

Typically, a compliant fuel cell electrolyte substructure such as the above described will include at least one of an anode layer, a cathode layer, and a current conductor bonded to the coated electrolyte structure. More preferably, a bonded combination of at least one metallic, ceramic, or cermet current conductor and at least one electrode (cathode and/or anode), with the electrode in electrical contact with both the current conductor and electrolyte structure, will be provided.

The present invention is not restricted to any particular family of electrode or current conductor. Thus, structures such as are typically formed of wire or mesh of platinum, platinum alloy, silver, or other noble metal, nickel or nickel alloys can be used, as can coatings or patterned layers of these materials. These conductive structures may act as current collectors which are provided on top of, beneath, or along side electrode layers.

Among the electrode materials useful in combination with electrolytes of the present invention are silver-palladium-zirconia compositions and cermet materials with 1–40% inert phase such as nickel/yttria stabilized zirconia cermets, noble metal/yttria stabilized zirconia cermets, these being particularly useful, but not being limited to use, as anode materials. Other materials useful as anode materials include alkaline earth-doped lanthanum chromite, titania-doped and/or ceria-doped yttria stabilized zirconia, conducting perovskites, and the like.

Useful cathode materials include such ceramic and cermet materials as strontium-doped lanthanum manganite, calcium-doped yttrium manganite, other alkaline earth-doped lanthanum chromites, cobaltites, and manganites, as well as noble metal/yttria stabilized zirconia cermets. The foregoing examples are merely illustrative of the various electrode materials which could be used.

Figure 3:
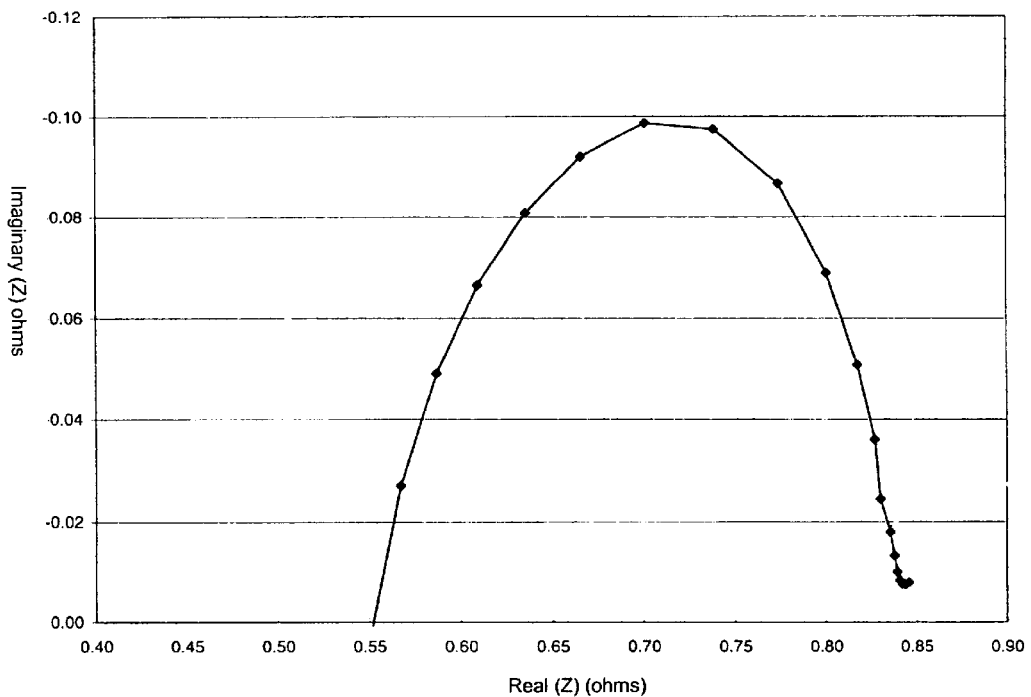
FIG. 3 is a complex impedance plot showing low interface resistance.

The roughened interface layers of the invention are particularly well suited for use with silver-palladium-zirconia electrode compositions and yttria partially stabilized zirconia electrolytes. In conjunction with silver-palladium-zirconia electrodes and a yttria partially stabilized zirconia electrolyte, a roughened interfacial nano-crystalline layer of less than about two microns in thickness can give an interface resistance of less than 0.1–0.3 ohm per cm² at less than 725° C. FIG. 3 illustrates the low interfacial resistance that can be achieved.

The roughened interfacial nano-crystalline layer of the present invention reduces interfacial resistance in solid electrolyte fuel cells. Reduced interface resistance leads to higher power densities and/or lower temperature operation of the fuel cell. In particular, while not wishing to be bound by theory, it is believed that the rough and/or porous nature of the interface allows more contact points for the silver palladium zirconia electrodes to bond to and to inject oxygen ions into the electrolyte.

The performance of a fuel cell is limited by its internal resistance, the maximum power for any power supply being given by $P_{max}=V^2/4R_{internal}$. The fuel cell circuit includes the electrolyte, electrodes, and current conductors. Internal resistance is the sum of several components, including the electrode ohmic resistance, the electrolyte resistance, the electrode/electrolyte interfacial resistance, and the current conductor resistance. Electrode/electrolyte interfacial resistance is a focus of this invention.

The electrolyte resistance depends on material properties and geometry and is proportional to the thickness of the electrolyte. In order to operate a fuel cell at less than 850° C., 800° C., or more, preferably less than 725° C., the electrolyte must be as thin as is practical. Using a thin flexible electrolyte, devices operating between 600° C. and 700° C. can be envisioned. In order to employ a thin electrolyte, it must be strong enough to enable handling. The choice of electrolyte is therefore important.

This is in contrast to tubular designs, where the electrolyte is supported on porous tubes on the order of 1 mm thick, and previous cell designs, where the electrolyte is 50 to 200 microns thick. One embodiment of the present invention utilizes a thin ceramic electrolyte, below 45 microns in thickness, preferably below 30 microns in thickness and most preferably below about 15 microns in thickness. Devices utilizing an electrolyte as thin as 5 microns may be useful. The resulting fuel cell components can possess a total thickness of less than 150 microns, the thinner electrolyte producing lower resistive losses, enhanced mechanical properties, and better utilization of raw materials. Due to the elastic compliance of the thin ceramic electrolyte, this electrolyte has the advantage of thermal stress relief through buckling which results in thermal shock resistance.

For example, a zirconia electrolyte with 2 to 6 mole % yttria contains at least some tetragonal phase which imparts transformational toughening to the electrolyte. This toughening can more than triple the strength over fully stabilized zirconia with 8 or 10% yttria. However, compositions with 6 to 10 mole % yttria exhibit a higher ionic conductivity. Therefore, compositions that are preferred include 3 to 10 mole % $Y_2O_3$ in $ZrO_2$, and most preferred include, 3 to 6 mole % $Y_2O_3$-$ZrO_2$. The latter is most preferred because it has higher mechanical strength at room temperature for processing.

Other preferred compositions include zirconias doped with 2–10 mole % total of $Sc_2O_3$, or of rare earth oxide (oxides of Nd, Sm, Eu, Gd, Tb, Dy, Ho, Er, Tm, Yb, and Lu), or of mixtures thereof Compositions at the lower to mid level of this dopant range also have a tetragonal phase similar to yttrium oxide dopant that increases the mechanical properties of the electrolyte and at the higher levels of dopants these compositions are predominately a cubic phase that has higher ionic conductivity.

The maximum power output per area of electrolyte determines the economic viability of the product. The preferred electrolytes of the present invention produce low internal resistance and high maximum power density. High power combined with slight geometry yields high power per unit volume and per unit weight.

The electrolyte resistance is a strong function of temperature. It is preferred that the fuel cells operate at less than 850° C., but more preferred that they operate at less than 725° C. Lower temperatures make it possible to use a wider ranger of materials, such as stainless steels and silver alloys. At these temperatures it is preferred that the total internal resistance be less than 1 ohm-cm², more preferred that it be less than 0.6 ohm cm², and most preferred that it be less than 0.4 ohm-cm². In order to achieve these total resistances, the various components of resistance must fall into certain ranges. At these same temperatures, the preferred range for the electrolyte resistance is less than 0.4 ohm-cm², more preferred being less than 0.2 ohm-cm², and most preferred is less than 0.1 ohm-cm².

As is well known, the electrode ohmic resistance is determined by the resistivity of the electrode, by its thickness, and by the length of the current path through the electrode. The resistivity of the electrode material limits the useful current path length. It is preferred that the electrode ohmic resistance be no greater than 0.4 ohm-cm², more preferred that it be less than 0.2 ohm-cm², and most preferred that it be less than 0.1 ohm-cm².

For metal or cermet electrodes, such as Ni alloy anodes and noble metal electrodes, the electrode resistivity can be quite low. In the case of metals, and especially noble metals such as silver, palladium, platinum, and gold, the resistivity of the metal is on the order of $10^{-5}$ to $10^{-6}$ ohm-cm and the electrode thickness can be reduced to between 0.1 and 50 microns, for example between 1 and 20 microns, without sacrificing performance. With $La_{0.85}Sr_{0.15}MnO_3$ and other perovskite materials, the resistivity is approximately $10^{-2}$ ohm-cm, 3 orders of magnitude higher, and designs must rely on very short path lengths, as low as 2 mm, thick electrodes, >20 microns, or highly conductive current collectors (see, e.g., U.S. Pat. No. 5,273,837 to Aitken et al., which is hereby incorporated by reference). Electrodes less than around 20 microns are preferred for minimizing material usage and enhancing flexibility and thermal shock resistance.

Performance is dependent on the current path length in the electrode with shorter paths yielding higher performance. Thicker electrodes are used to compensate for long path lengths but this results in higher material costs and a more rigid and less compliant device. Some designs, such as tubular designs, utilize at least one thick electrode, with $t_{el}$>100 microns, to minimize electrode resistance. Because the distance between interconnection points, 1, is usually greater than 2 cm, tubular designs typically need an electrode 1 mm thick or thicker. Planar designs seek to reduce electrode resistance by multiple contacts between the interconnects and the cell electrodes using spacings between contacts of less than 1 cm and as little as 2 mm. These designs may use line contacts between the interconnection material and the electrodes. The interconnects themselves must bridge between adjacent cells and must separate the air from the fuel while acting as a structural member.

The electrode ohmic resistance in the fuel cells of the present invention may be reduced though the use of current collecting grids. For a given electrode material, thickness, and grid, the current invention reduces electrode resistance by reducing the current path length. The use of grids makes it possible to use cells with longer current path lengths. In the absence of grids, it is necessary to use cells with short current path lengths.

Numerous cell patterns are possible with the fuel cell of the present invention. Cells can be arranged to increase performance, strength, or ease of manufacture. For example, a cell can utilize both parallel and series connections which can increase the reliability of the device. To optimize performance, cells on the same device can be printed with differing cell lengths, and thus differing areas. Cell geometry can be chosen to make better use of fuel or fuel delivery. Cells can be arranged in linear rows, concentric rings, triangular wedges, or any other shape chosen so as to allow manifolding or improved performance.

Another aspect of the present invention is a solid oxide fuel cell design including at least two multiple cell fuel cells, wherein the at least two multiple cell fuel cells are combined in an alternating fuel/air manifold wherein similar electrodes of adjacent multiple cell fuel cells face each other under conditions effective to form regions of air or fuel without additional gas separation or interconnection layers.

Yet another aspect of the present invention is a method of making a solid oxide fuel cell. This method involves providing an electrolyte substrate, applying a least one interfacial nano-crystalline layer onto at least one surface of the electrolyte substrate, sintering the at least one interfacial nano-crystalline layer, and applying at least one electrode layer to the at least one interfacial nano-crystalline layer.

The fuel cell of the present invention can be made by first preparing a coated electrolyte according to the methods described above. The electrodes are then applied to the coated electrolyte and fired. The method of application can include any known in the art including, but not limited to, screen printing, transfer printing, vapor deposition, electro-less plating, and the like. The electrodes may be applied in a single step or may require multiple steps using one or more methods to form the desired microstructure and composition. After application, the electrodes may or may not be heat-treated to achieve their desired properties. It is preferred that the electrode/coated electrolyte/electrode tri-layer retains some flexibility. Leads may then be attached to the fuel cell.

EXAMPLES

Example 1
Preparation of a Ceramic Slip
A ceramic slip is made containing 100 grams of zirconia powder using the components shown in Table 1, below.

TABLE 1

Components of Slip Batch

| Component | Manufacturer | Form | Function | Batch mass |
|---|---|---|---|---|
| Tosoh TZ-3Y zirconia | Tosoh | powder | ceramic | 100.0 g |
| Ethanol | Mallinkrodt | liquid | solvent | 36.36 g |
| 1-Butanol | Fisher | liquid | solvent | 8.79 g |
| Propylene Glycol | Fisher | liquid | solvent | 2.00 g |
| Water (distilled) | | liquid | solvent | 2.50 g |
| Emphos PS-21A phosphate ester | Witco | liquid | dispersant | 1.00 g |

All ingredient bottles are kept tightly closed until used to reduce water pickup. A 250 ml Nalgene® polyethylene plastic container is cleaned by rinsing twice with about 10–20 ml of ethanol or methanol. The container is then placed in a 70° C. drying oven to evaporate the alcohol. After drying, the container and lid are weighed. The zirconia powder is weighed out in a weighing boat and set aside. The ethanol is pipetted into the dried Nalgene® polyethylene container. The 1-butanol is then pipetted into the plastic container. Subsequently, propylene glycol is pipetted into the container. Finally, the water and, then, the Emphos® PS-21A phosphate ester dispersant are pipetted into the container. About 450 grams of 10 mm Tosoh TZP-3Y zirconia milling media is weighed out and the weight recorded. The media is then added to the container and the container is gently shaken. The zirconia powder is then added from the weighing boat. The lid is replaced onto the container and tightened. The closed container is re-weighed and the total weight of solvents, powder, and dispersant is calculated. The slip is then subjected to vibratory milling for 72 hours, after which the viscosity of the slip is measured.

Two settling steps are performed in order to remove the coarse grains and narrow the grain size distribution in the slip. A double settling technique provided a good grain size distribution with acceptable material losses.

A second 125 ml Nalgene® plastic container and lid are washed and dried as above. The second container and lid is weighed and the weight recorded. The slip from the milling container is poured into the-second container, leaving the milling media in the original container. The slip and second container with lid is then weighed. The coarse grains are allowed to settle out of the slip for 72 hours. A third container and lid are washed, dried, weighed, and the weight recorded. Carefully, the unsettled slip is pipetted into the third container, being careful not to pick up any of the settled sediment. The pipetted slip with the third container with lid are weighed. This slip is then allowed to settle for an additional 24 hours. The residue/sediment in the second container is dried in a ventilated oven at about 90° C. for at least three hours and the dried residue and container plus lid are weighed.

A fourth 125 ml plastic container and lid are washed and dried as above. The weight of this fourth lid and container is then recorded. Again, the slip from the third (24 hour settling) container is pipetted into the fourth container, being careful not to pick up any of the settled residue with the pipette. The fourth container and slip are weighed and the weight recorded. The reside is dried in the third container, as above, and then weighed. From the recorded weights, it can be determined how much ceramic powder is left in the fourth container.

A weak flocculating agent, glacial acetic acid, a plasticizer, and a binder are added to the ceramic powder present in the remaining slip. The components used for flocculation and binding, reported in weight percent in excess of the weight of the remaining ceramic powder, are shown in Table 2, as follows:

TABLE 2

Components Used For Flocculation and For Binder System

| Component | Manufacturer | Form | Function | Batch mass |
|---|---|---|---|---|
| Glacial Acetic Acid | Malinckrodt | liquid | flocculant | 1 wt % of remaining ceramic powder |

TABLE 2-continued

Components Used For Flocculation and For Binder System

| Component | Manufacturer | Form | Function | Batch mass |
|---|---|---|---|---|
| Isopropyl alcohol | Fisher | liquid | acid dilution | 1 wt % |
| Dibutyl-Pthalate | Aldrich | liquid | plasticizer | 3.5 wt % |
| Polyvinyl Butyral | Monsanto | powder | binder | 6 wt % |

A 50/50 wt % solution of glacial acetic acid in isopropyl alcohol is made. 2 wt % (in excess of the weight of the remaining ceramic powder) of this solution is pipetted into the slip in the fourth container. The lid is replaced and the container is gently shaken.

3.5 wt % (in excess of the weight of the remaining ceramic powder) of dibutyl-pthalate is pipetted into the slip in the fourth container. The lid is replaced and the container is gently shaken. Using a weighing boat, 6 wt % (of the remaining ceramic powder) of polyvinyl butyral is weighed out and poured into the slip. The lid is replaced and the container is gently shaken. This container is then placed on a paint shaker type of device for at least 15 minutes to fully dissolve the binder. Two clean zirconia milling media are put into the container and the container is placed on a roller mill at low speed for three days.

Example 2
Preparation of a Dilution Solution

For preparation of a dilution solution, a similar recipe to the ceramic slip in Example 1 is used, but with no ceramic powder or dispersant being added (see Table 3, below). Hence, no settling steps are necessary.

TABLE 3

Dilution Solution

| Material | Amount (grams) |
|---|---|
| Ethanol (200 Proof) | 72.8 |
| 1-Butanol | 17.7 |
| Propylene Glycol | 4.06 |
| Deionized H$_2$O | 5.11 |
| Dibutyl Phthalate | 7.08 |
| Polyvinyl butyral | 12.03 |

The above amounts of fluids are pipetted into a clean 250 ml container. The polyvinyl butyral is weighed in a weighing boat and added last. The mixture is shaken like the ceramic slip above.

Example 3
Preparation of a Diluted Slip

Using a 125 ml Nalgene® plastic container, 5.63 grams of the ceramic slip is pipetted into the container, then 9.55 grams of the dilution solution is added. The container is shaken by hand for about thirty seconds

Example 4
Preparation of an Electrolyte Coated with a Particulate Interface Layer Using a small lab scale tape caster (a unit made by Pacific Scientific, the Gardner/Neotec Instrument Division, Silver Spring, Md.) and a 0.5 mil clearance casting blade (spacing between the blade and sheet surface), a thin electrolyte substrate consisting of a sintered zirconia-3 mole % yttria flexible electrolyte about 20 microns in thickness and 4 cm by 8 cm in size is coated by the following procedure.

A piece of MYLAR® plastic film is placed on the caster with the vacuum pump running. Small holes are then punched in the plastic film just smaller than the size of the substrate. With the long axis of the substrate aligned with the direction of blade motion, the substrate is placed on the caster. Using a disposable pipette, the diluted ceramic slip is transferred onto the full width of the substrate, but only on one end. The caster is run, letting the blade ride up over the substrate. After the entire length of the substrate is coated, the caster is turned off. After the coating had dried somewhat, the plastic film and substrate are taken off the caster, the film is peeled off the substrate, and the substrate is dried in an oven at 70° C., being careful not to put the wet substrate bottom onto the rails of the drying oven as the substrate will stick to them when dry. If the substrate were allowed to dry filly on the plastic film, the slip that goes underneath the substrate would make the substrate stick to the film. When the substrate is dry, the process is repeated on the other side. A new piece of plastic film is used for every coating casting. By applying only a small amount of slip to the substrate, less slip ran under the substrate.

The coating is sintered in air at temperatures of 1200–1430° C. on a schedule of 1° C./minute to 700° C., 8° C./minute to the sintering temperature, hold for 1 hour, then cool at 8° C./minute. 1300° C. is a good sintering temperature.

Example 5
An Electrode/Electrolyte Assembly for an SOFC Device

A zirconia-3 mole % yttria electrolyte with zirconia-3 mole % yttria interface layers is prepared as in Example 4. Symmetric electrodes 2.5 cm×1 cm in area are then printed on opposite sides of the electrolyte with interface layer in accordance with the following procedure.

An electrode printing mixture is prepared and screen printed on both sides of the electrolyte (cathode and anode). The screen printing vehicle consisted of conventional proportions of TEXANOL® ester alcohol solvent from the Eastman Chemical Co. Kingsport, Tenn., ethyl cellulose T100 polymer from Hercules Aqualon, Hercules Incorporated, Houston, Tex., BYK-354 polyacrylate leveling agent from BYK-Chemie, Wesel, Germany, Anti-Terra 202 polycarboxylic acid salt dispersant also from BYK-Chemie, and Hypermer LP4 aliphatic ester dispersant from ICI Americas, Inc., Wilmington, Del.

The solids component of the screen printing mixture consists of an alloy/ceramic powder mixture wherein the alloy is a 90 wt % silver/10 wt % palladium alloy available from Englehard Corporation, Iselin, N.J., and the ceramic powder, making up 47 volume % of the solids, is 3Y-ZrO$_2$ powder from the Tosoh Corporation, Tokyo, Japan. After firing at 900° C., the electrode thickness is approximately 10 microns. The resulting body is thin and flat.

The electrical impedance of this assembly is tested in the complex plane at a measurement temperature of 722° C. and the results plotted to evaluate the interface characteristics of the assembly. The resulting plot, presented as FIG. 3 of the drawings, shows a real interface resistance of less than 0.3 ohm/cm$^2$ for two electrode interfaces, corresponding to an interface resistance of 0.15 ohm/cm$^2$ for at each single electrode/electrolyte interface.

Example 6
A Solid Oxide Fuel Cell Assembly

An electrode/electrolyte composite prepared as described in Example 5 above is incorporated into a simple fuel cell assembly for evaluating fuel cell performance. Prior to constructing the cell, the electrode selected to function as the anode of the cell is first treated to enhance its catalytic activity toward hydrogen dissociation. For that purpose, the anode is infiltrated with a nickel precursor in the form of a 0.5 M solution of nickel nitrate by repeated (10×) application of the nitrate solution to the anode with a cotton swab. Drying between applications is accomplished by placing the sample on a hot plate at 350° C.

To configure the fuel cell, silver wire leads are first attached to the electrodes using silver paste and a simple manifold is then constructed. A fuel reservoir is formed by edge-sealing the electrolyte composite to a stainless steel backing sheet to form an envelope having fuel inlet and outlet ports at opposing ends, and a fuel gas feed tube is then sealed into the inlet port. Edge-sealing of the envelope and inlet tube is by means of a stainless steel ceramic composite paste (Duralco 230 paste from the Cotronics Corporation, Brooklyn, N.Y.

Alumina felt is inserted into the fuel reservoir outlet to act as an exhaust restriction and the fuel cell assembly is then inserted into a furnace with the feed tube connected to a source of hydrogen for testing. In this configuration, the furnace chamber forms the air or oxidant reservoir of the fuel cell with furnace air furnishing the necessary oxygen to the exposed fuel cell cathode.

To test the cell, the furnace is heated while hydrogen fuel is supplied to the anode within the fuel reservoir envelope through the feed tube. At the same time, the cathode or air electrode is exposed to a convective flow of ambient air in the furnace, with a thermocouple cemented directly to the air side of the electrolyte providing an accurate indication of fuel cell operating temperature.

Figure 4:
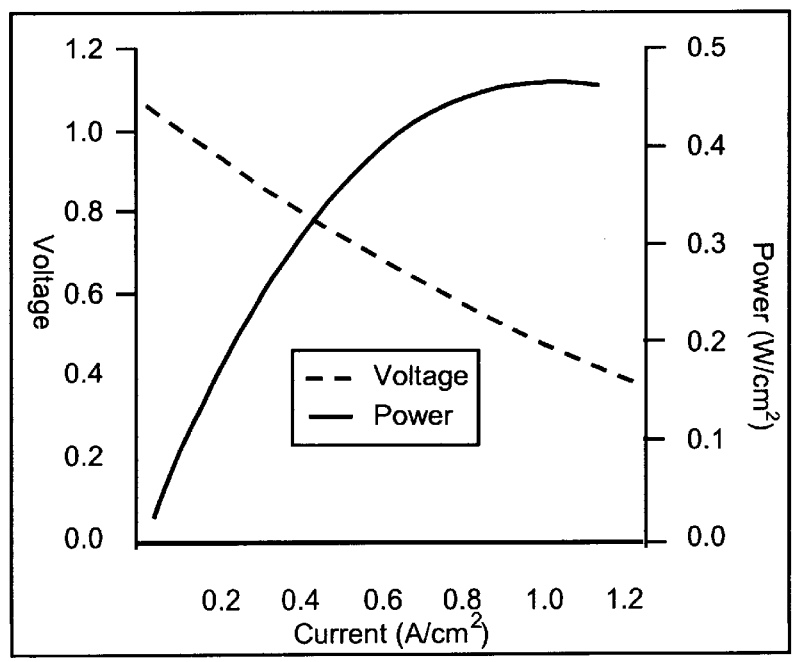
FIG. 4 is a graph showing a power curve and voltage curve of a single cell symmetric electrode sample at 725° C. with hydrogen fuel.

FIG. 4 graphs the performance of the fuel cell over a range of operating temperatures that includes the temperature of maximum cell power output. With pure hydrogen as the fuel, a maximum cell power density of about 0.46 W/cm$^2$ is observed at an output current near 1.0 A/cm$^2$ with a cell operating temperature of 725° C.

While the use of symmetric ceramic-silver alloy electrodes as described in Examples 5 and 6 above well illustrates the advantages of the roughened interface layers of the invention, such electrodes form no part of the invention but are more fully described and claimed in the co-pending, commonly assigned application of M. Badding et al., filed concurrently herewith.

Although the invention has been described in detail for the purpose of illustration, it is understood that such detail is solely for that purpose, and variations can be made therein by those skilled in the art without departing from the spirit and scope of the invention which is defined by the following claims.

We claim:

1. An electrolyte structure coated on at least one surface with a roughened interfacial nano-crystalline layer.

2. The electrolyte structure according to claim 1, wherein the electrolyte structure is a polycrystalline ceramic.

3. The electrolyte structure according to claim 2, wherein the polycrystalline ceramic is selected from the group consisting of stabilized zirconia, partially stabilized zirconia, stabilized hafnia, and partially stabilized hafnia.

4. The electrolyte structure according to claim 3 wherein the polycrystalline ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W, and mixtures of said dopants.

5. The electrolyte structure according to claim 1, wherein the electrolyte structure is about 5 microns to about 45 microns thick.

6. The electrolyte structure according to claim 1, wherein the electrolyte structure is a free-standing thin electrolyte.

7. The electrolyte structure according to claim 1, wherein the interfacial layer is the same composition as the electrolyte structure.

8. The electrolyte structure according to claim 1, wherein the interfacial layer is a ceramic.

9. The electrolyte structure according to claim 8, wherein the ceramic is selected from the group consisting of partially stabilized zirconia, stabilized zirconia, CeO2 doped with Y2O3, CeO2 doped with Pr, and mixtures thereof.

10. The electrolyte structure according to claim 9, wherein the ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W, and mixtures of said dopants.

11. The electrolyte structure according to claim 1, wherein the interfacial layer is up to about 5 microns thick.

12. The electrolyte structure according to claim 2, wherein the interfacial layer further comprises an electronic conductive phase intermixed with the ceramic.

13. The electrolyte structure according to claim 12, wherein the electronic conductive phase is a metal, metal alloy, or cermet.

14. The electrolyte structure according to claim 13, wherein the electronic conductive phase is a metal selected from the group consisting of platinum, palladium, gold, silver, and mixtures thereof.

15. A method of making an electrolyte structure with a roughened interfacial nano-crystalline layer, said method comprising:

providing an electrolyte substrate;

applying an interfacial nano-crystalline layer onto at least one surface of the electrolyte substrate; and sintering the interfacial layer.

16. The method according to claim 15 further comprising sintering the electrolyte substrate before said providing.

17. The method according to claim 15, wherein the electrolyte substrate is a polycrystalline ceramic.

18. The method according to claim 17, wherein the polycrystalline ceramic is selected from the group consisting of stabilized zirconia, partially stabilized zirconia, stabilized hafnia, and partially stabilized hafnia.

19. The method according to claim 18, wherein the polycrystalline ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W, and mixtures of said dopants.

20. The method according to claim 15, wherein the electrolyte substrate is about 5 microns to about 45 microns thick.

21. The method according to claim 15, wherein the electrolyte substrate is a free-standing thin electrolyte.

22. The method according to claim 15, wherein the interfacial layer is the same composition as the electrolyte substrate.

23. The method according to claim 15, wherein the interfacial layer is a ceramic.

24. The method according to claim 23, wherein the ceramic is selected from the group consisting of partially stabilized zirconia, stabilized zirconia, CeO2 doped with Y2O3, CeO2 doped with Pr, and mixtures thereof.

25. The method according to claim 24, wherein the ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W, and mixtures of said dopants.

26. The method according to claim 15, wherein the interfacial layer is up to about 5 microns thick.

27. The method according to claim 15, wherein the interfacial layer further comprises an electronic conductive phase.

28. The method according to claim 27, wherein the electronic conductive phase is a metal, metal alloy, or cermet.

29. The method according to claim 28, wherein the electronic conductive phase is a metal selected from the group consisting of platinum, palladium, gold, silver, and mixtures thereof.

30. The method according to claim 15, wherein said applying comprises coating the electrolyte substrate with a precursor compound that decomposes to grains.

31. The method according to claim 30, wherein said precursor compound is selected from the group consisting of zirconium acetate, zirconium oxynitrate, zirconium chloride, zirconium sulfate, zirconium hydroxide, colloidal zirconia, and mixtures thereof.

32. The method according to claim 15, wherein said applying comprises tape casting.

33. A solid oxide fuel cell comprising:
   a positive air electrode;
   a negative fuel electrode;
   an electrolyte structure interposed between the positive air electrode and negative fuel electrode; and
   a roughened interfacial nano-crystalline layer interposed between the electrolyte structure and at least one of the positive air electrode and negative fuel electrode.

34. The fuel cell according to claim 33, wherein the positive air electrode is a silver-palladium-zirconia electrode and the negative fuel electrode is a silver-palladium-zirconia electrode.

35. The fuel cell according to claim 33, wherein the electrolyte structure is a polycrystalline ceramic.

36. The fuel cell according to claim 35, wherein the polycrystalline ceramic is selected from the group consisting of stabilized zirconia, partially stabilized zirconia, stabilized hafnia, and partially stabilized hafnia.

37. The fuel cell according to claim 36, wherein the polycrystalline ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er Tm, Yb, Lu, In, Ti, Sn, Nb, Ta, Mo, W, and mixtures of said dopants.

38. The fuel cell according to claim 33, wherein the electrolyte structure is about 5 microns to about 45 microns thick.

39. The fuel cell according to claim 33, wherein the electrolyte structure is a free-standing thin electrolyte.

40. The fuel cell according to claim 33, wherein the interfacial layer is the same composition as the electrolyte structure.

41. The fuel cell according to claim 33, wherein the interfacial layer is a ceramic.

42. The fuel cell according to claim 41, wherein the ceramic is selected from the group consisting of partially stabilized zirconia, stabilized zirconia, CeO2 doped with Y2O3, CeO2 doped with Pr, and mixtures thereof.

43. The fuel cell according to claim 42, wherein the ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W, and mixtures of said dopants.

44. The fuel cell according to claim 33, wherein the interfacial layer is up to about 5 microns thick.

45. The fuel cell according to claim 33, wherein the interfacial layer further comprises an electronic conductive phase.

46. The fuel cell according to claim 45, wherein the electronic conductive phase is a metal, metal alloy, or cermet.

47. The fuel cell according to claim 46, wherein the electronic conductive phase is a metal selected from the group consisting of platinum, palladium, gold, silver, and mixtures thereof.

48. The fuel cell according to claim 33, wherein the electrolyte structure is bonded to a plurality of electrodes on opposing sides of the electrolyte structure under conditions effective to produce multiple cells connected in series or parallel.

49. A solid oxide fuel cell comprising:
   a positive air electrode;
   a negative fuel electrode;
   an electrolyte structure interposed between the positive air electrode and negative fuel electrode, wherein the electrolyte structure is bonded to a plurality of electrodes on opposing sides of the electrolyte structure under conditions effective to produce at least two multiple cells connected in series or parallel and wherein the at least two multiple cell fuel cells are combined in an alternating fuel/air manifold wherein similar electrodes of adjacent multiple cell fuel cells face each other under conditions effective to form regions of air or fuel without additional gas separation or interconnection layers; and
   a roughened interfacial nano-crystalline layer interposed between the electrolyte structure and at least one of the positive air electrode and negative fuel electrode.

50. A method of making a solid oxide fuel cell comprising:
   providing an electrolyte substrate;
   applying at least one interfacial nano-crystalline layer onto at least one surface of the electrolyte substrate;
   sintering the at least one interfacial nano-crystalline layer; and
   applying at least one electrode layer to the at least one interfacial nano-crystalline layer.

51. The method according to claim 50 further comprising sintering the electrolyte substrate before said providing.

52. The method according to claim 50, wherein the electrolyte substrate is a polycrystalline ceramic.

53. The method according to claim 52, wherein the polycrystalline ceramic is selected from the group consisting of stabilized zirconia, partially stabilized zirconia, stabilized hafnia, and partially stabilized hafnia.

54. The method according to claim 53, wherein the polycrystalline ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures of said dopants.

55. The method according to claim 50, wherein the electrolyte substrate is about 5 microns to about 45 microns thick.

56. The method according to claim 50, wherein the electrolyte substrate is a free-standing thin electrolyte.

57. The method according to claim 50, wherein the interfacial layer is the same composition as the electrolyte substrate.

58. The method according to claim 50, wherein the interfacial layer is a ceramic.

59. The method according to claim 58, wherein the ceramic is selected from the group consisting of partially stabilized zirconia, stabilized zirconia, CeO2 doped with Y2O3, CeO2 doped with Pr, and mixtures thereof.

60. The method according to claim 59, wherein the ceramic is selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W, and mixtures of said dopants.

61. The method according to claim 50, wherein the interfacial layer is up to about 5 microns thick.

62. The method according to claim 50, wherein the interfacial layer further comprises an electronic conductive phase.

63. The method according to claim 62, wherein the electronic conductive phase is a metal, metal alloy, or cermet.

64. The method according to claim 63, wherein the electronic conductive phase is a metal selected from the group consisting of platinum, palladium, gold, silver, and mixtures thereof.

65. The method according to claim 50, wherein said applying at least one interfacial layer comprises coating the electrolyte substrate with precursor compounds that decompose to grains.

66. The method according to claim 65, wherein said precursor compounds are selected from the group consisting of zirconium acetate, zirconium oxynitrate, zirconium chloride, zirconium sulfate, zirconium hydroxide, colloidal zirconia, and mixtures thereof.

67. The method according to claim 50, wherein said applying at least one interfacial layer comprises tape casting.

68. The method according to claim 50, wherein said applying at least one electrode layer comprises screen printing.

* * * * *